J. G. BAKER.

BLOWING-MACHINE.

No. 7,291. Reissued Sept. 5, 1876.

Witnesses.

Herman Moessner

Henry Howson Jr

Inventor.

John G. Baker by his attorneys

Howson and Son

N. PETERS, PHOTO-LITHOGRAPHER, WASHINGTON, D. C.

UNITED STATES PATENT OFFICE.

JOHN G. BAKER, OF PHILADELPHIA, PENNSYLVANIA.

IMPROVEMENT IN BLOWING-MACHINES.

Specification forming part of Letters Patent No. 145,382, dated December 9, 1873; reissue No. 7,291, dated September 5, 1876; application filed August 12, 1876.

*To all whom it may concern:*

Figure 1:
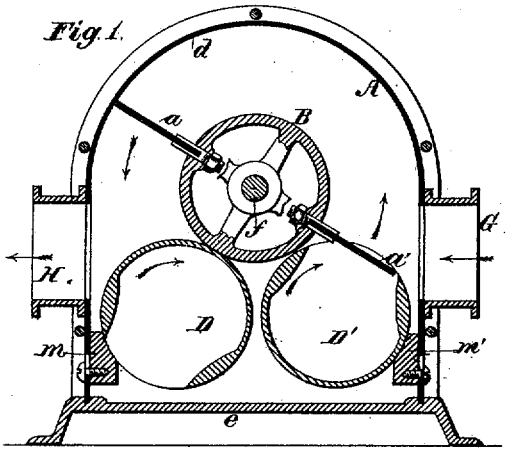
Figure 2:
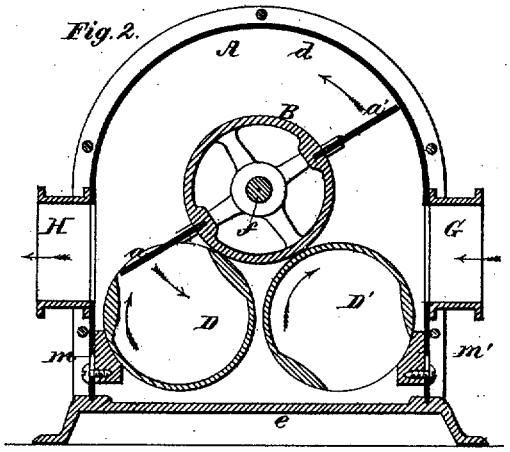
Figure 3:
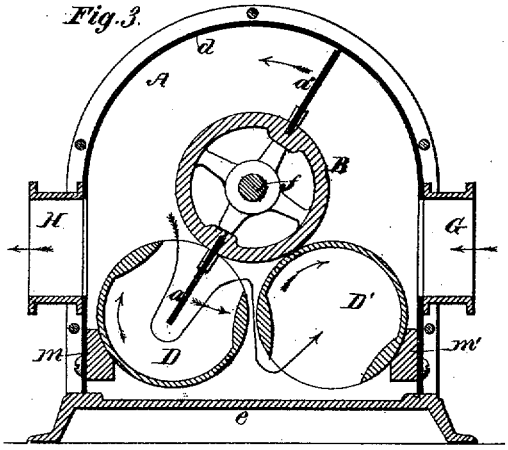
Figure 4:
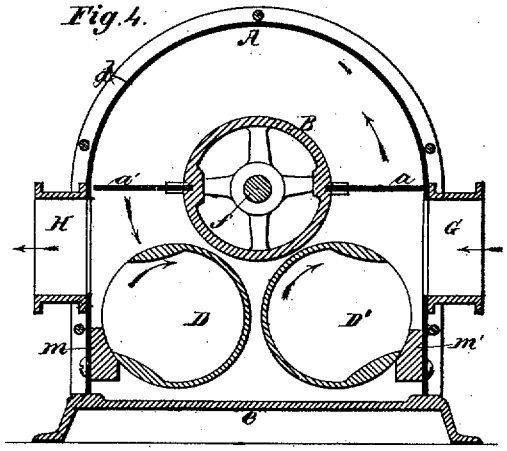

Be it known that I, JOHN G. BAKER, of Philadelphia, Pennsylvania, have invented an Improved Blowing-Machine, of which the following is a specification:

The object of my invention is to obtain a continuous supply of compressed air by combining, within a chest, A, a revolving cylinder, B, having two vanes, *a* and *a'*, and two revolving and slotted cylinders, D and D', as shown in the vertical section, Figure 1 of the accompanying drawing, so that, as the cylinder B turns in the direction of the arrow, air will enter the casing at the inlet G, and will be discharged, under a pressure depending upon the speed of the cylinders, through the outlet H, the cylinders D and D' serving to prevent communication between the inlet and outlet under all circumstances, while their slots permit the free rotation of the vanes.

Another object of my invention is to obtain large vanes of more extended area in proportion to the size of the chest than in other blowers of this class.

The main advantages of my improved blower are, first, its comparative freedom from the friction which detracts from the efficiency of blowers of this class, and, second, increased blowing capacity due to the extended area of the vanes.

Figure 5:
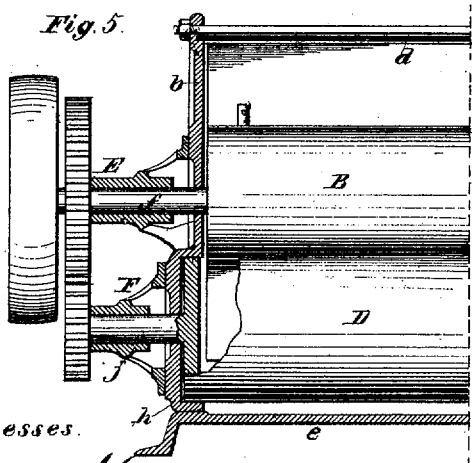
Figure 6:
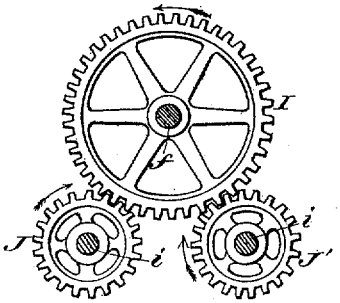

The chest A is composed of two heads, *b b*, (one of which is shown in the longitudinal section, Fig. 5, of half of the machine,) the intervening casing *d*, and the base *e*, all being properly fitted and secured together. The top of the chest is semi-cylindrical, and concentric with the cylinder B, the shaft *f* of which passes through the head *b* and bearing E at both ends of the machine. The lower portion of the chest is rectangular, or of any other form, so as to admit the two slotted cylinders D and D', each closed end of each of which fits snugly, but so as to turn freely, in a recess, *h*, formed in the inside of the head, as shown in Fig. 5, the shaft *i* of each of these rollers passing through the head, and through a bearing, F, attached to the same. The shafts *f i i* are geared together by wheels I, J, and J', (shown in Fig. 6,) these wheels bearing such proportion to each other that the cylinders D and D' will revolve exactly twice as fast as the cylinder B. The cylinder B is as close to the cylinders D and D' as possible without being in absolute contact therewith, and the outer edges of the vanes, while they are not permitted to touch the upper semi-cylindrical portion of the chest, must revolve in close contiguity with the same, a similar rule being observed as regards the proximity of the ends of the cylinders with the inside of the heads, and of the cylinders D and D' with the blocks *m m'*, which I prefer to make of wood, and which extend from end to end of the chest. Comparatively nice workmanship will be demanded in carrying out this rule, and there must necessarily be a slight leakage at many of the points, which, theoretically speaking, should be tight; but the loss by leakage will be very trifling, compared with the loss of power by friction, if the parts referred to above were in actual contact with each other. In other words, the slight loss by leakage is much more than compensated for by the freedom of the moving parts of the machine from frictional contact with each other and with the chest. The latter may be so contracted as to be close to the cylinders D and D', in which case the blocks *m m'* may be dispensed with; but I prefer the use of the blocks, and to so connect them to the casing that they can be adjusted to the said cylinders.

The operation of the machine will be best understood by an examination of Figs. 1, 2, 3, and 4, which represent the moving parts of the machine in different positions. In Fig. 1, for instance, the vane *a* is in the act of forcing compressed air through the outlet H, while air has free access to the space behind this vane and above the vane *a'*. While the parts are in this position the compressed air is prevented from escaping through any other course than the outlet by the close contiguity of the cylinder B with the cylinder D, and of the latter with the block *m*. When the vanes have arrived at the position shown in Fig. 2, the vane *a* will have forced its supply of compressed air through the outlet, and the vane *a'* will have commenced to perform the same duty with another supply, while the cylinder D presents its slot or opening to the vane *a*, and permits the latter to pursue its course without contact with any part of the said cylinder D. When the vanes have arrived at the position, Fig. 3, the compressed air in front of the vane $a'$ can pass the cylinder D, but will be arrested by the cylinder D′ in its attempts to gain access to the inlet end of the chest. Whatever the position of the vanes may be, one or other, or both, of the cylinders D and D′ will prevent all communication between the inlet and outlet sides of the chest, while the slots of these cylinders will always be presented to the vanes at the proper time to enable them to pursue an uninterrupted course.

There is one other important feature of my invention, which may be applied with advantage to all blowing-machines in which a vaned cylinder for creating the blast is combined with a slotted cylinder or cylinders for admitting the vanes, and for preventing all communication between the inlet and outlet sides of the chests. I allude to the extent to which the vanes penetrate the slotted cylinders as the machine operates.

It will be seen the outer edges of the vanes can penetrate to, or even beyond, the centers of the slotted cylinders, which are so constructed as to permit this penetration.

The greater the depth to which the vanes can penetrate the slotted cylinders the greater may be the area of the vanes, and the greater the blowing capacity of the machine, which is not increased in size or cost by this increased area of vanes.

I claim as my invention—

1. A blower in which are combined, within a chest, A, a cylinder, B, its vanes $a$ $a'$, and the slotted cylinders D and D′, all substantially as described.

2. The combination, in a blowing-machine, of a revolving cylinder, to which vanes are secured, with a recessed or slotted revolving cylinder, to or beyond the center of which the said vanes extend as the machine operates, for the purpose specified.

In testimony whereof I have signed my name to this specification in the presence of two subscribing witnesses.

JOHN G. BAKER.

Witnesses:
HERMAN MOESSNER,
HARRY SMITH.